Aug. 11, 1959     C. W. DOEPKE ET AL     2,899,107
FEEDER FOR DISPENSING SMALL ARTICLES
Filed June 24, 1957     5 Sheets-Sheet 1

INVENTORS.
Charles Wm. Doepke.
BY Blaine S. Aston.
Wood, Herron & Evans
ATTORNEYS.

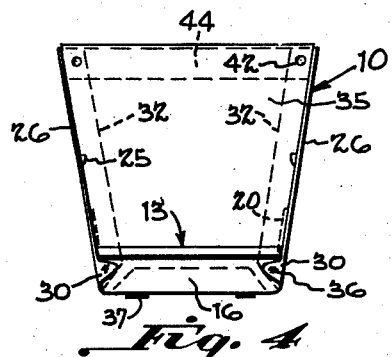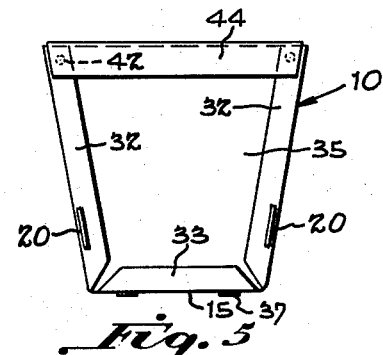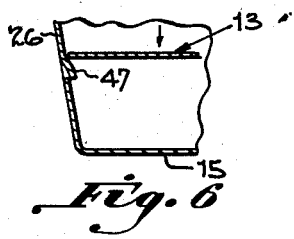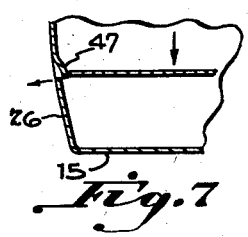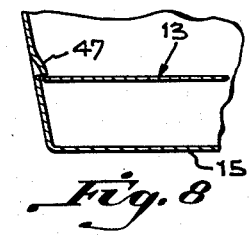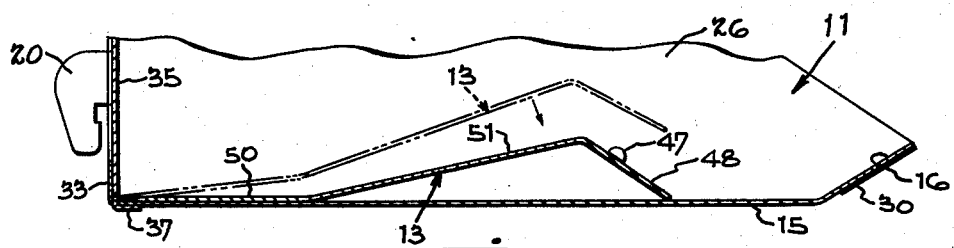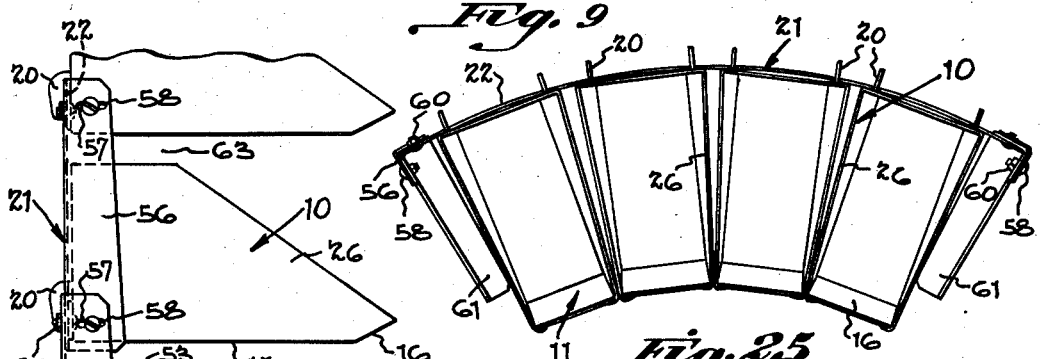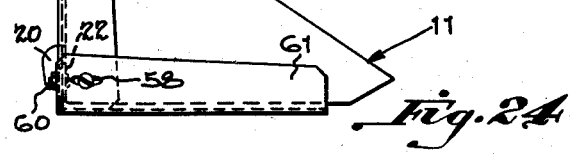

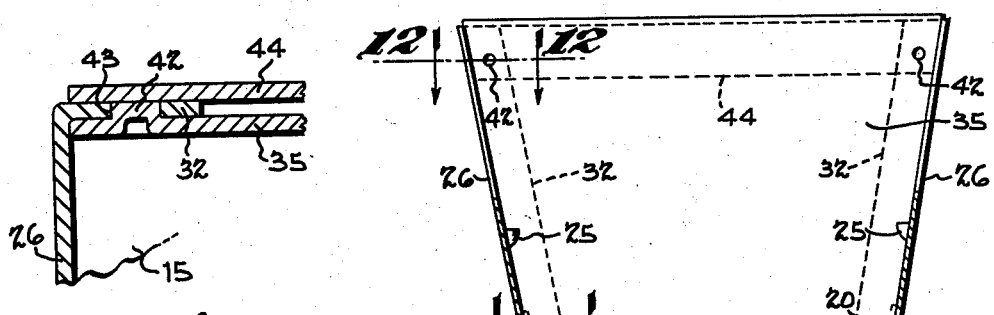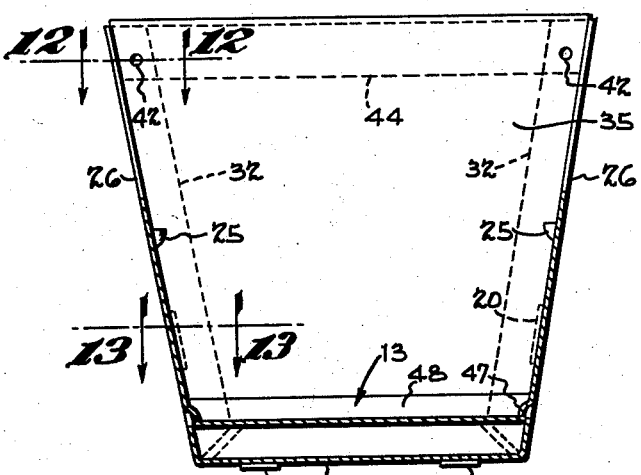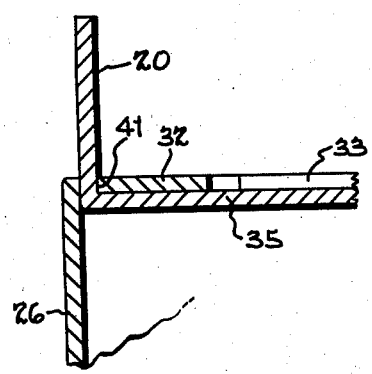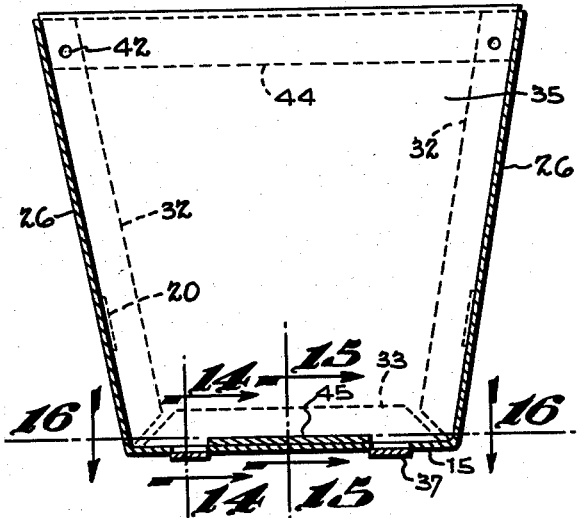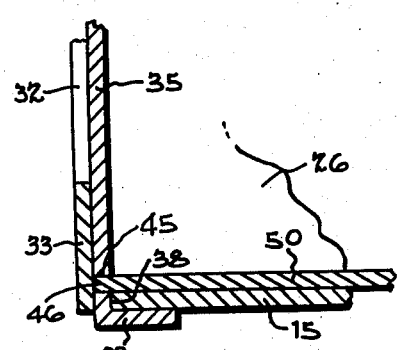

Aug. 11, 1959　　　C. W. DOEPKE ET AL　　　2,899,107
FEEDER FOR DISPENSING SMALL ARTICLES
Filed June 24, 1957　　　　　　　　　　　　　5 Sheets-Sheet 4
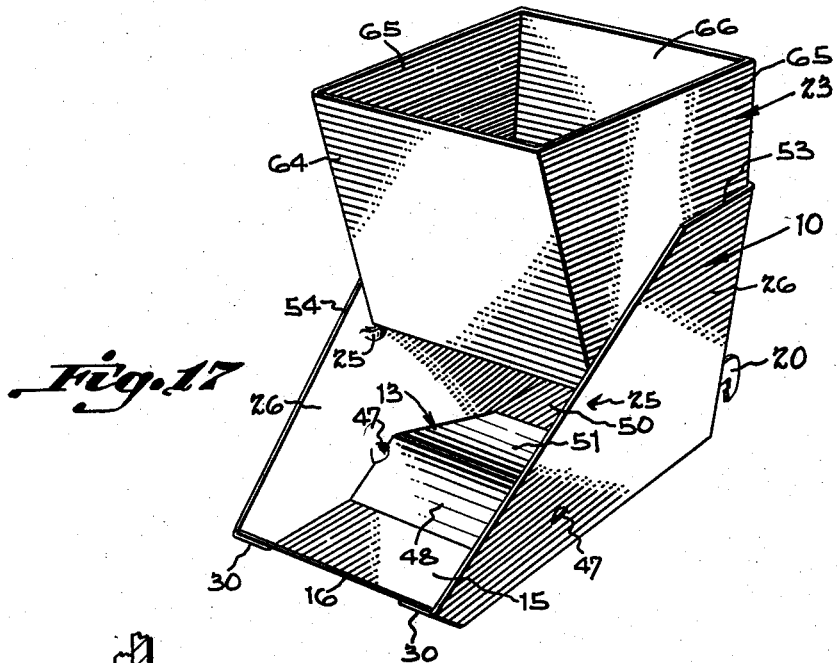
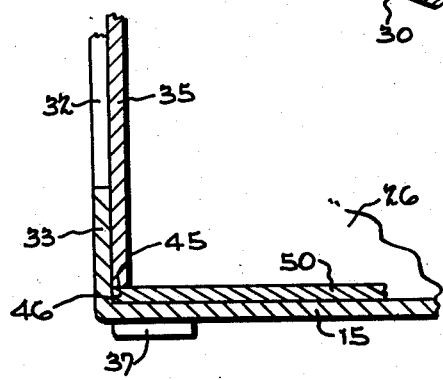
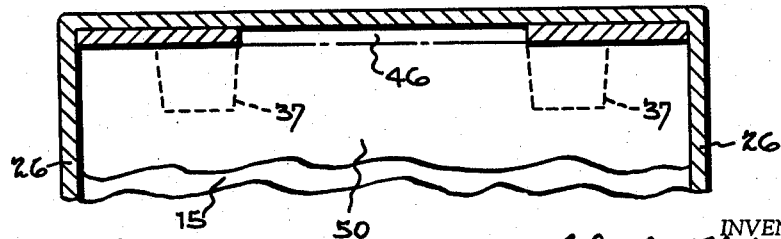
INVENTORS.
Charles Wm. Doepke.
BY Blaine S. Aston.
Wood, Herron & Evans.
ATTORNEYS.

Aug. 11, 1959 — C. W. DOEPKE ET AL — 2,899,107
FEEDER FOR DISPENSING SMALL ARTICLES
Filed June 24, 1957 — 5 Sheets-Sheet 5

INVENTORS.
Charles Wm. Doepke.
BY Blaine S. Aston.
Wood, Herron & Evans.
ATTORNEYS.

2,899,107

FEEDER FOR DISPENSING SMALL ARTICLES

Charles W. Doepke and Blaine S. Aston, Cincinnati, Ohio, assignors, by mesne assignments, to Nestier Corporation, Cincinnati, Ohio, a corporation of Ohio Application June 24, 1957, Serial No. 667,371

11 Claims. (Cl. 222—143)

This invention relates to a feeder or dispenser for small parts, such as screws, nuts, and other articles which are used in assembly operations. The invention is directed particularly to the type of equipment which comprises multiple units, the several units dispensing a complete assortment of parts which are utilized in a given assembly operation.

The present structure is intended particularly for assembly operations involving relatively small, complex devices which require a large selection of small parts. In an operation of this kind, it is important that the parts be presented for rapid convenient selection, with the least amount of lost motion. The work usually is carried out at a table, the parts feeders being mounted on the table in a position facing the worker.

In assembling a device, the worker dips manually into the feeder unit for the required part, for example, a screw of a particular size, an article which is to be attached and a nut and washer. It is apparent that, for efficient operation, the parts of each different kind must be presented in a position which is distinct from the other parts, allowing him to reach instinctively for the required part as it is needed.

One of the primary objectives of the invention has been to provide an open feed box or bin, so constructed that any number of individual boxes may be stacked one above another and in side-by-side relationship to supply an assortment of parts for the requirements of any given assembly station.

Another objective has been to provide a feed box which presents a limited quantity of segregated parts on a smooth flat surface at the open face of the feed box, such that the worker is able to select an individual part surely and rapidly by placing his finger upon the part and skidding it across the flat surface to be grasped between the thumb and finger without lost motion.

In general, the present invention contemplates a generally rectangular feed box having a bottom, a pair of side walls, and a rear wall, the side walls sloping downwardly from the rear wall to the front which forms an open mouth presented to the worker. The bottom of the box includes a feed control plate, the rearward portion of this plate being inclined in an upward and forward direction from the rear wall. The forward edge of the plate slopes downwardly to the flat bottom of the feed box which includes an upwardly inclined parts retaining lip at its outer end. The rearward, upwardly inclined portion of the plate forms a partial barrier for a batch of parts which is stored in the rearward hopper section of the feed box and the downwardly inclined forward skid portion of the plate allows the user to advance limited quantities of parts from the mass to the flat bottom surface at the fore part of the feed box. The open fore part of the box constitutes a withdrawal section, which is presented to the worker.

The number of segregated parts maintained in temporary storage in the withdrawal section is such that the parts do not entirely cover the bottom surface and do not lie on top of one another, instead they are spaced apart one from the other. When used in dispensing flat parts, such as nuts and washers, or parts which have flat surfaces, which applies to most of the parts used, the worker is able to select a single part by the sense of touch by placing one finger in contact with a part resting on the flat bottom surface of the withdrawal section. Once having contacted the part, the worker skids the part outwardly along the flat bottom and upwardly across the retainer lip. Upon reaching the edge of the lip, the selected part is grasped between the finger and thumb in a natural manner, then placed directly upon the assembly on which he is working. The parts in the withdrawal section are replenished as needed by sliding them with the fingers from the mass in storage and down the skid plate to the withdrawal section.

When the feed box is to be used for dispensing parts which are not flat, such as small screws and other parts which are not readily skidded from the withdrawal section, a soft deformable cushion is mounted in the flat bottom of the withdrawal section. In this case, the parts are also advanced in limited quantity from the mass in the storage section to the cushion for convenient selection of individual parts. Since the parts cannot be skidded, the worker simply presses the selected part partially into the pad with his fingers, such that the cushion holds it in place while the grasps the part between the finger and thumb. On the other hand, the worker may depress his fingers into the soft pad with the fingers straddling the part which is resting on the cushion; he is thus able to pick up each part without groping about for it.

To permit the feed boxes to be stacked one above the other, the rearward end of each box is provided with a pair of downwardly facing hooks which provide a detachable connection with the feed box below it in the stack. The hooks of each box engage the upper edge of the box below, the boxes of the stack all extending in cantilever fashion one above the other, with the open mouth or withdrawal section of each presented to the worker. The side walls of each feed box taper or converge downwardly from top to bottom, such that the lower portion of each box of the stack nests partially within the upper portion of the feed box below it. The feed boxes also taper or converge slightly from the rear wall toward the forward end, such that the boxes reside in a natural arc for motion economy when the stacks are placed side-by-side. The hook-on connection of the boxes makes it possible to assemble as many boxes as are required for the assortment of parts at each assembly station.

For assembly stations where it is desired to remove the feed boxes individually from the stack for replenishment of parts, a support rack is furnished, the hooks being arranged for connection with horizontal rails carried by the rack. The rack preferably has a curvature which supports the boxes in an arc in front of the worker for motion economy, as noted above. The rails of the rack support the boxes one above another at sufficient spacing to allow the individual boxes to be unhooked from the rails and to be replaced after having been refilled.

For increasing the capacity of one or more of the feed boxes at any assembly station, an extension hopper is provided. This hopper is generally rectangular and includes an open lower end which resides within the upper portion of the feed box. The extension hopper is provided with a clip which engages the rear wall of the feed box and its forward end is supported upon a pair of dimples which are pressed inwardly from the side walls of the feed box, the clip and dimples providing a three-point support for the extension hopper. The parts within the hopper are fed from its lower end directly into the storage section of the feed box and the feeding of parts to the withdrawal section is accomplished in the manner explained above.

Another feature of the invention resides in the simple but rugged construction of the feed box. To provide low cost fabrication, the bottom and side walls of the box are formed from a single sheet metal blank, the rear wall and hooks constituting a second blank. After the side walls are erected, the hooks which project outwardly along opposite side edges of the rear wall blank, are passed through slots formed in the side walls and are bent rearwardly, thus clinching the erected side walls to the rear wall. The feed control plate likewise is in the form of separate blank which is snapped in place after the feed box proper is erected. For this purpose, the rear wall includes a slot and the rearward edge of the feed plate includes a tongue which fits into the slot and provides a hinged connection. With the rearward edge of the plate thus hinged to the rear wall, the plate is swung downwardly toward the bottom of the feed box. The side walls of the feed box, which converge inwardly from top to bottom, are provided with a respective detent or dimple which intercepts the side edges of the feed plate. As the plate reaches its final position, its side edges pass across the detent dimples, spreading the side walls apart; the side walls snap back to their normal position as the edges of the plate pass beyond the dimples, such that the dimples overlie the edges of the plate and lock it permanently in position.

Various other features and advantages of the invention will be more clearly apparent to those skilled in the art from the following detailed description taken in conjunction with the accompanying drawings.

In the drawings:

Figure 4 is a front elevation of one of the feed boxes.

Figure 5 is a rear elevation of the feed box.

Figures 6, 7 and 8 are enlarged fragmentary sectional views showing the feed control insert being snapped into position within the feed box.

Figure 9 is a fragmentary sectional view similar to Figure 2, further illustrating the manner of installing the feed control insert.

Figure 10 is a sectional view taken along line 10—10 of Figure 2, detailing the construction of the feed box and its feed control insert.

Figure 11 is a sectional view taken along line 11—11 of Figure 2, illustrating the rear wall construction of the feed box.

Figure 12 is an enlarged fragmentary sectional view taken along line 12—12 of Figure 10, detailing the rear corner construction of the box.

Figure 13 is an enlarged fragmentary sectional view taken along line 13—13 of Figure 10, illustrating the hook construction at the rear of the box.

Figure 14 is a sectional view taken along line 14—14 of Figure 11, detailing the connection of the rear wall to the bottom of the feed box.

Figure 15 is a sectional view taken along line 15—15 of Figure 11, detailing the connection of the feed control plate with the rear wall of the feed box.

Figure 16 is a sectional view taken along line 16—16 of Figure 11, detailing the connection of the feed control plate with the rear wall of the feed box.

Figure 17 is a perspective view showing the feed box with an extension hopper mounted in position.

Figure 24 is a side elevation showing the feed boxes mounted upon a rack as distinguished from the arrangement shown in Figure 1.

Figure 25 is a plan view of the rack mounting of Figure 24, showing the boxes disposed in a natural arc for convenient selection of parts.

*General arrangement*

Figure 2:
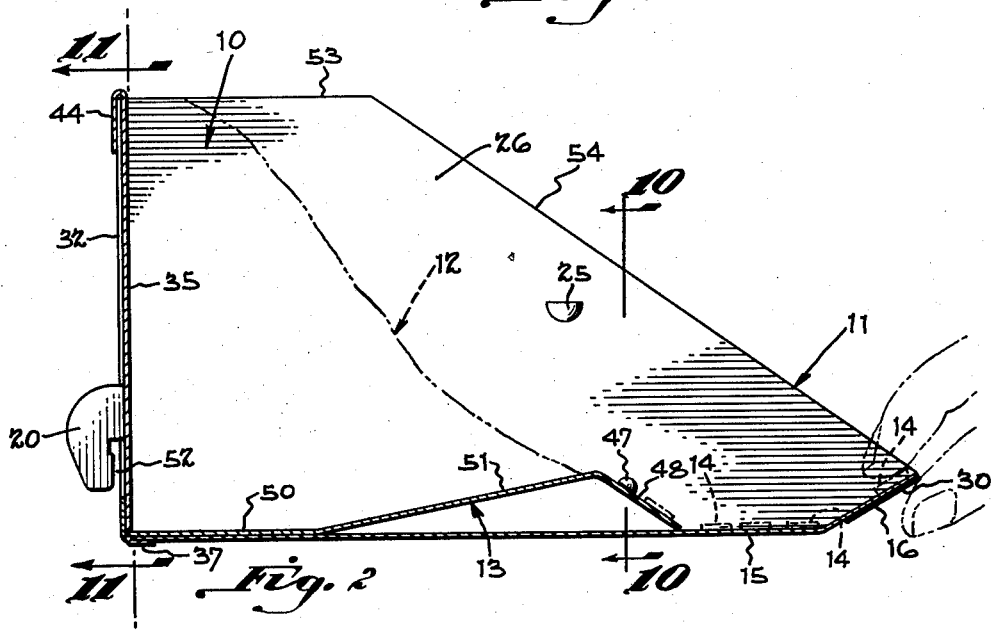
Figure 2 is an enlarged sectional view detailing the construction of one of the feed boxes.

Referring to Figure 2, the feed box or parts bin in general comprises a storage section indicated generally at 10 for confining a supply of small parts in the rearward portion of the box, and an open mouth or parts withdrawal section indicated generally at 11, disposed at the forward portion of the feed box. The small parts stored in the storage or hopper section assume a natural angle of repose 12 as indicated by the broken line; this angle varies naturally in accordance with the shape and other characteristics of the parts, small flat parts such as washers, being selected as an example in this view. The parts stored in the hopper section 10 rest upon the feed control plate, indicated generally at 13, which is snapped in place as described later.

As indicated in broken lines, a limited supply of parts 14, as controlled by the worker, is maintained in the withdrawal section 11 to enable the worker to withdraw the parts individually in a rapid, convenient manner. As shown in Figure 2, the worker or user places his finger upon a part selected from the group 14, then slides the selected part forwardly across the flat bottom 15 and over the edge of the retainer lip 16, at which point the part is grasped between the thumb and fore finger. The feed box is fabricated from sheet metal as explained later in detail.

Figure 3:
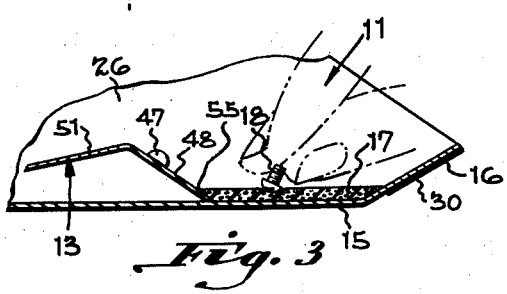
Figure 3 is a fragmentary sectional view of the forward or withdrawal section of the feed box, showing a modification of the structure shown in Figure 2.

The modified withdrawal section 11 shown in Figure 3, is identical to the above, except that a soft, deformable pad 17, formed of sponge rubber or the like, is cemented to the bottom 15. This structure is utilized in feeding small parts 18, which are not flat, such as screws, nuts or any other shape the nature of which requires the part to be grasped instead of skidded for withdrawal. The resilient pad 17 preferably is cemented to bottom 15 after the control insert 13 is snapped in place. It will be noted in Figure 3, that the pad prevents the part, such as screw 18, from skidding since the screw is pressed partially into the pad with the fingers, thus allowing the user to grasp or manipulate the part in a convenient manner.

Figure 1:
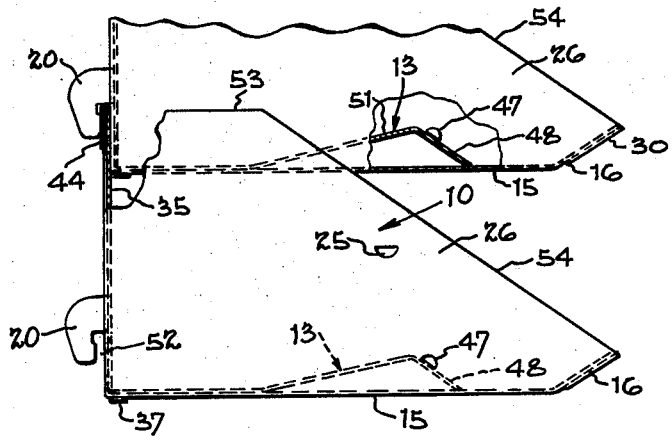
Figure 1 is a side elevation, partially broken away, showing several of the feed boxes of this invention stacked one upon another at an assembly station.

As shown in Figure 2, each feed box is provided with a pair of hooks 20—20 projecting outwardly from the rearward wall thereof, such that the boxes may be stacked one upon another at an assembly station, with the lowermost box resting upon the table or other work surface (Figure 1). By this arrangement, each feed box holds a supply of a given part, the stacked boxes providing an assortment of parts which are used in that particular assembly operation. When stacked in this manner, the stacked boxes may be placed along side one another in the form of batteries to accommodate as many different parts as are required.

In the modification shown in Figures 24 and 25, the feed boxes are shown mounted in battery formation upon a rack 21, utilizing the same hooks 20. In this case, the hooks are detachably engaged upon the rails 22 of the rack, which are generally arcuate as viewed from above. In this arrangement, the forward or withdrawal sections 11 of the feed boxes reside alongside one another so as to place the parts within convenient reach of the user for economy of motion. As described later, the rack 21 is of sectional construction and may be erected in as many sections as required, each section supporting its own bank of feed boxes in side-by-side relationship.

The demountable hopper extension 23, shown in Figures 20 to 23, is utilized to increase the capacity of the feed boxes if necessary. Each extension is generally rectangular as viewed in Figure 22, each having an open top and an open delivery end which resides above the storage section 10. The rearward wall of the extension hopper is provided with a clip 24 which provides a detachable connection with the upper edge of the rear wall of the feed box. The forward end of the extension hopper rests upon a pair of support dimples 25 which are pressed inwardly from the side walls of the feed box as described later. The extension hopper is intended primarily for those feed boxes which require an additional supply of parts, for example, boxes which dispense larger parts or those dispensing parts which are used in greater number upon a given assembly.

*Feed box construction*

Figure 18:
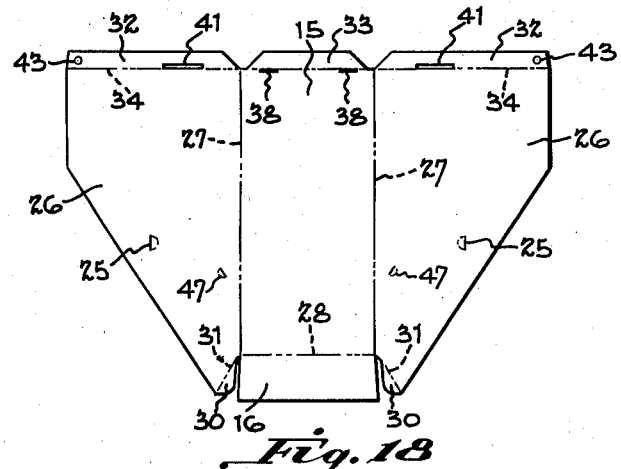
Figure 18 is a plan view of the sheet metal blank which forms a major portion of the feed box.

Described in detail with reference to Figure 2, each feed box comprises a bottom, previously indicated at 15, a pair of integral side walls 26—26 and the withdrawal lip 16, formed from a single sheet metal blank. As shown in Figure 18, the side walls 26 are bent upwardly from the bottom 15 along the bending lines 27, and the withdrawal lip 16 is bent upwardly from the bottom along the line 28. The forward edge of each side wall 26 includes a tab 30 which is bent along line 31 to underlie the withdrawal lip 16, as indicated in Figure 4. The rearward edge of each side wall panel 26 is provided with a marginal flange 32, and the bottom 15 includes a flange 33, the three flanges being bent inwardly at right angles along the bend lines 34. The rear wall 35 of the feed box is formed by the blank shown in Figure 19, as described later.

In fabricating the feed box, the side walls 26 are erected, the marginal flanges 32 and 33 are bent inwardly to their right angular positions, the withdrawal lip 16 is erected, and the tabs 30 are bent to underlie the endwise portions of the lip. The tabs 30 are then spot welded to the lip as indicated at 36 in Figure 4.

The rear wall blank 35 is installed by inserting the lugs 37 (Figure 19) into the slots 38 formed in the bottom panel. The hooks 20 are joined along the bend lines 40 to the rear wall blank 35. These hooks are inserted through the slots 41 of the feed box blank and are then bent rearwardly so as to project beyond the marginal flanges 32—32 (Figure 13), thus locking the side walls in erected position.

Figure 19:
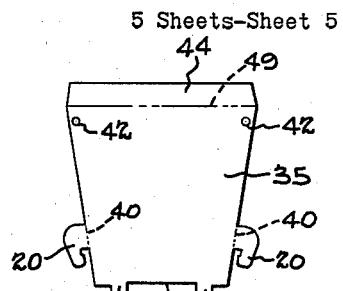
Figure 19 illustrates the blank which forms the rear wall of the feed box.

As shown in Figures 10, 12 and 19, the rear wall blank 35 is provided with locating pins 42—42 projecting outwardly from its rearward surface; the side wall flanges 32 are provided with apertures 43, which when the side walls are erected, reside in registry with the locating pins 42. The locating pins thus project through the apertures, joining the upper portions of the side walls to the rear wall. As shown in Figures 12 and 19, the upper edge of the rear wall blank includes a marginal flange 44 delineated by the bend line 49. After the locating pins are inserted into the holes, rear wall flange 44 is bent downwardly upon itself so as to overlie the endwise portions of the side wall flanges 32, thus permanently locking the locating pins 42 of the rear wall to the side walls.

When completely assembled, the rear wall 35 is joined rigidly to the bottom and side wall of the feed box by the hooks 20 (which clamp the side walls 26 together) and the locating pins 42 which are locked into the flanges 32 by the rear wall doubled flange 44. In addition, the lower edge of the rear wall is connected to the bottom by the lugs 37, which subsequently are bent at right angles to reside against the bottom (Figure 14), the lower edge of the rear wall thus being clinched to the bottom 15.

Referring to Figures 11 and 19, it will be noted that the lower edge of the rear wall between the lugs 37, is spaced above the surface of the bottom as indicated at 45. The stepped insert plate 13 includes at its rearward edge a tongue 46 which interfits the slot 45 (Figure 16), thus hingedly connecting the insert plate to the feed box. After the tongue is engaged in the slot, the insert is pivoted downwardly, as indicated in broken lines in Figure 9, to the positions of Figures 6 to 8.

In order to provide the snap-on connection of insert 13, the side walls of the feed box are provided with respective inwardly pressed detents or dimples 47—47, each dimple being inclined downwardly and inwardly from its wall surface. As the insert 13 is hinged downwardly, its opposite edges are intercepted by the detents, such that the side walls are wedged apart from one another by the insert as it is forced over the dimples (Figure 7). Upon passing the dimples, the side walls snap back to their normal position, such that the dimples overlie the insert (Figure 8).

It will be noted in Figure 9, that the forward end portion 48 of the insert 13, which is engaged by the dimples 47, is inclined downwardly in the forward direction, the engaged surface of the detent dimple being similarly inclined. The dimples are thus effective to lock the insert both downwardly and rearwardly against withdrawal. Since the tongue 46 is engaged in the slot 45, the rearward end of the insert is locked securely to the feed box.

As best shown in Figure 2, the flat rearward portion 50 of the insert resides in flush relationship with the bottom 15 of the feed box and the rearward portion blends into an upwardly inclined load-supporting section 51. The downwardly inclined section 48 referred to above, acts as a skid surface which directs the parts from the hopper section 10 to the withdrawal section 11.

The upward slope of the load-supporting section 51 is sufficient to partially confine the mass of parts in the rearward hopper section 10 of the feed box, the parts assuming the angle of repose previously indicated by the broken line 12. In other words, the load-supporting section, due to its upward inclination, acts as a partial barrier to the mass of parts.

When the feed box is in use, the worker advances a limited number of parts from time to time from the main mass resting upon the load-supporting section 51 by sliding the parts with the fingers forwardly along the barrier section 51 and down the skid section 48 to the bottom 15 as previously indicated at 14 in Figure 2. Preferably, the number of parts stored in the withdrawal section is limited, such that the parts are spaced apart and do not rest one upon another. Therefore, it is a simple matter for the worker to place his finger upon an individual part and to skid the part forwardly along the bottom and upwardly along the retainer lip 16, as described earlier.

Figure 20:
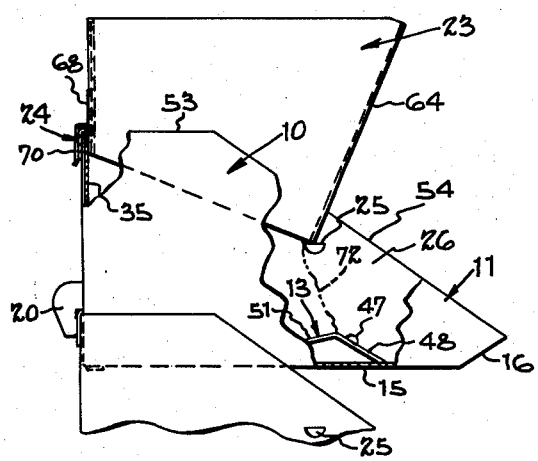
Figure 20 is a view similar to Figure 1, further illustrating the demountable extension hopper mounted upon one of the feed boxes.
Figure 21:
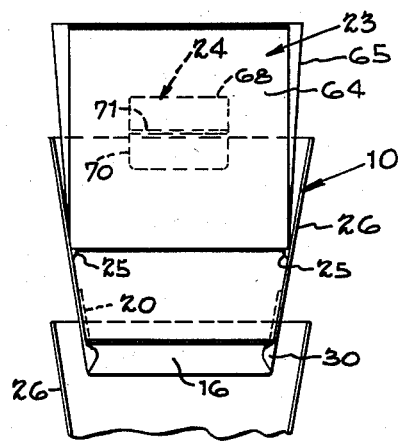
Figure 21 is a front elevation as projected from Figure 20.

As explained above, the marginal flange 44 of the rear wall (Figure 12) overlies the side wall flange 32 along the rearward corners of the feed box, thus reinforcing this portion of the box. When the boxes are stacked one upon another as shown in Figure 1, the hooks 20 engage the mating box near the reinforced corner section as shown in Figures 20 and 21. As shown in Figure 21, the side walls of the feed boxes converge or taper toward one another from top to bottom, such that the lower end of one feed box nests within the upper end of the box to which it is joined. The taper of the side walls also permits the feed boxes to be nested compactly within one another for storage or shipment.

As viewed in Figures 1 and 20, each feed box is supported in cantilever fashion from the rearward wall 35 of the lower box to which it is joined. The opening or slot 52 of each hook has a width slightly greater than the thickness of the flanged upper edge 44 of the rear wall, such that the hook fits snugly thereon. It will be noted in Figure 1, that the bottom of each box extends downwardly below the hook. Accordingly, the cantilever load is carried in tension from the hook to the flanged edge 44 and acts in compression from the bottom of the box against the rear wall below the flanged edge. Since the upper edge of the rear wall is reinforced by the flange 44, the rear wall structure is able to resist these forces without excessive springing or bending.

It will be noted in Figures 1 and 2, that the upper edge of each side wall extends horizontally from the rear wall as at 53, then slopes downwardly as at 54 to the edge of the withdrawal lip 16. This inclination, combined with the load-supporting portion of the feed control plate, delineates the hopper section 10. When stacked one upon another as shown in Figure 1, the sloping edges 54 provide adequate clearance to allow the worker to dip into the withdrawal section 11 of the selected box without interference. The openings also allow the operator clearly to see the parts within the boxes; to further improve visibility, the insert and bottom of the box preferably provided with a bright finish.

As noted earlier, the soft pad 17 shown in Figure 3, is installed in those boxes which are intended for parts which are not flat in shape. The pad preferably is cemented in place after the insert plate 13 has been installed in the box, such that the pad overlies the edge of the skid section as at 55. In using the feed box, equipped with the pad, the worker periodically advances a limited quantity of parts down the skid section 48 to the pad where they are easily picked up as explained earlier.

*Rack structure*

As viewed in Figures 24 and 25, the support rack 21 comprises metal sections or legs 56 which are right angular in cross section. Each section or leg is provided with a pair of elongated holes 57 at its opposite ends, the adjoining sections being attached by means of screws 58 passing through the holes 57, the screws each including a nut 60 drawing the parts firmly together. The lower ends of the rack are provided with feet 61, which also consist of angle sections 56 attached by screws 58 to the lower end of the legs.

The rails 22, which support the feed boxes, are in the form of flat metal bars attached by screws 58 to the rearward webs of the legs 56. The screws pass through both webs of the overlapped legs and thus stiffen the assembly. The rails 22 are of the same thickness as the flanged edge 44 of the rear walls, previously described, such that the hooks 20 fit over the rails in the same manner. It will be noted in Figure 24 that the rack supports the boxes one above the other a greater distance than the spacing which exists when the boxes are stacked upon one another (Figure 1). The spacing, which is indicated at 63 permits the boxes to be removed individually from the rack if desired for refilling. It will be understood that the sectional construction of the rack makes it possible to assemble the racks to any desired height to accommodate the parts requirements at any given assembly station.

As shown in Figure 25, rail 22 has a curved shape so as to position the boxes in a natural arc for economy of motion. Straight line rails (not shown) also are furnished for supporting the boxes in a straight line. This arrangement may be used, for example, where more than one worker is withdrawing parts from the same assembly of feed boxes.

*Extension hopper*

Figure 22:
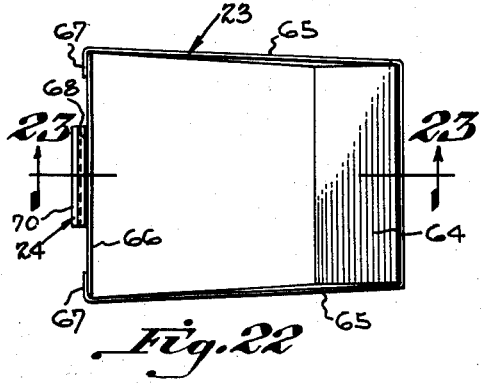
Figure 22 is a top plan view of the extension hopper.
Figure 23:
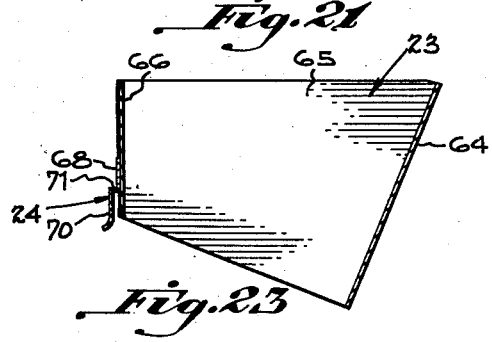
Figure 23 is a sectional view taken along line 23—23 of Figure 22, further illustrating the extension hopper.

The extension hopper, as shown in Figures 22 and 23, comprises a front wall 64, a pair of side walls 65—65 and a rear wall 66. The rear wall, in the form illustrated, consists of a separate blank, the side walls being flanged as at 67 and spot welded to the side edges of the rear wall. The mounting clip 24 consists of a shank 68 which is secured as by spot welding to the rear wall, and includes a limb 70 spaced outwardly from the rear wall by a connecting section 71. The spacing between the limb 70 and rear wall is approximately equal to the thickness of the flanged edge 44 of the rear wall 35 of the feed box. As viewed in Figure 21, the width of the hopper extension is slightly less than the width of the feed box, such that the lower end of the hopper fits between the feed box walls with its forward end resting upon the support dimples 25, previously noted.

The extension hopper is installed simply by slipping the clip over the upper edge of the feed box rear wall and allowing the forward portion of the box to rest by gravity upon the support dimples. The clip 24 and dimples 25 thus provide a three-point suspension for the hopper. As shown in broken lines in Figure 20, the forward wall 64 of the hopper inclines downwardly and inwardly and its lower edge resides above and slightly to the rear of skid plate 48. Accordingly, the parts from the extension hopper assume an angle of repose approximately as indicated by the broken line 72. In this case, the parts tend to flow naturally down the skid surface 48 to the flat bottom 15.

Having described our invention, we claim:

1. A feeder for dispensing individual small parts from a batch comprising, a feed box, having a bottom, a pair of side walls, a rear wall, and an open mouth at the forward portion of the feed box, said side walls having upper edges which are inclined downwardly toward the forward portion of the feed box, the said forward portion having a parts retainer lip which is inclined upwardly and forwardly from said bottom, a feed control plate residing in the bottom of said feed box, coacting means on the feed box and control plate latching said plate within the feed box, said plate having a load-supporting section residing in the rearward portion of the feed box and supporting a batch of parts, said load-supporting section being inclined upwardly and forwardly from said rear wall toward the forward portion of the feed box, a skid section joined to the forward end of said load-supporting section, said skid section being inclined downwardly and forwardly from said load-supporting section toward the forward portion of the feed box, the end of said skid section contacting said bottom along a line which is displaced rearwardly from said retainer lip and exposing the bottom within said open mouth of the feed box and delineating a parts withdrawal section, said load-supporting section providing a partial barrier which sustains a batch of parts in the rearward portion of the feed box, the said exposed portion of the bottom providing a storage space for a limited quantity of parts, whereby a worker may advance parts from the batch which is sustained in storage in the said load-supporting section and down the inclined skid section to said exposed bottom and subsequently skid said parts individually by finger engagement across said bottom and upwardly along the inclined retainer lip to the edge thereof to be grasped as the part is skidded across said edge.

2. A feeder for dispensing parts comprising, a feed box having a bottom, a pair of side walls, a rear wall and an open mouth at the forward portion thereof, a feed control plate residing on said bottom, said plate having a barrier section residing in the rearward portion of the feed box, said barrier section being inclined upwardly from said rear wall toward the forward portion of the feed box, a skid section joined to the forward edge of said barrier section, said skid section being inclined downwardly and forwardly from said barrier section, the forward edge of the skid section contacting the bottom of the feed box and exposing the forward portion of the bottom within said open mouth, and a generally horizontal flat cushion secured upon said exposed bottom, said cushion extending forwardly from said skid section within said open mouth, said cushion being formed of yieldable material, the parts being advanced in limited quantity from said barrier section down the skid section to the said cushion, whereby a selected part is partially embedded in said cushion when downward pressure is applied to a part resting thereon, whereby a worker may grasp a part with the fingers while the part is held in position by the cushion.

3. A feeder for dispensing small parts individually comprising, a feed box having a generally flat horizontal bottom, a pair of side walls and a rear wall, said side walls delineating an open mouth at the forward portion of the feed box, a feed control plate residing in the bottom of the feed box, said feed control plate having a barrier section residing in the rearward portion of the feed box, said barrier section being inclined upwardly from said rear wall toward the forward portion of the feed box, said control plate having a skid portion joined to the forward end of the barrier section, said skid section being inclined downwardly and forwardly from the forward end of the said barrier section, said skid section having an outer end engaging said bottom and thereby exposing a portion of said bottom within said open mouth, a tongue element projecting outwardly from the rearward end of said feed control plate, the said rear wall having a slot engaging said tongue and thereby hingedly connecting the feed control plate to the rear wall, said side walls each including a detent element, said detent elements being inclined downwardly and inwardly from the internal surface of said side walls, said detent elements overhanging the side edges of said skid section, whereby said feed control plate is installed by engaging the tongue in said slot and thereafter swinging the plate downwardly to pass the skid section over said detent elements, whereby the side walls are forced apart causing said detent elements to snap in position overlying the skid section in final position engaging the bottom of the feed box.

4. A feeder for dispensing small parts individually from a batch comprising, a feed box having a generally flat horizontal bottom, a pair of side walls and a rear wall, said side walls delineating an open mouth at the forward portion of the feed box, said side walls converging inwardly from the upper edges thereof toward said bottom, a feed control plate residing in the bottom of the feed box, said feed control plate having a barrier section residing in the rearward portion of the feed box, said barrier section being inclined upwardly from said rear wall toward the forward portion of the feed box, said control plate having a skid portion joined to the forward end of the barrier section, said skid section being inclined downwardly and forwardly from the forward end of the said barrier section, a retainer lip joined to the forward end of said bottom, said retainer lip being inclined upwardly and forwardly from said bottom, said skid section being displaced rearwardly from said retainer lip and having an outer end engaging said bottom and thereby exposing a portion of said bottom within said open mouth, a tongue element projecting outwardly from the rearward end of said feed control plate, the said rear wall having a slot engaging said tongue and thereby hingedly connecting the feed control plate to the rear wall, said side walls each including a detent element, said detent elements being inclined downwardly and inwardly from the internal surface of said side walls, said detent elements overhanging the side edges of said skid section, whereby said feed control plate is installed by engaging the tongue in said slot and thereafter swinging the plate downwardly to pass the skid section over said detent elements, whereby the inwardly converging side walls are forced apart causing said detent elements to snap in position overlying the skid section in final position engaging the bottom of the feed box.

5. A feeder for dispensing parts individually from a batch comprising, a feed box having a generally flat horizontal bottom and a pair of side walls formed from a single blank of sheet metal, a rear wall secured to the rearward end of said feed box, said rear wall formed from a separate blank which includes a pair of hook elements projecting outwardly from the side edges thereof, said side walls each including a slot, the hook elements of said rearward wall passing through said slots from the internal surface of said side walls and being bent rearwardly substantially in parallelism with said side walls, said hook elements engaging the external surfaces of said side walls and clinching the side walls to the opposite edges of said rear wall, said side walls delineating an open mouth at the forward portion of the feed box, a feed control plate mounted in the bottom of said feed box, said feed control plate having a load bearing surface which is inclined upwardly and forwardly from said rear wall, said feed control plate having a skid section which is inclined downwardly and forwardly from the forward end thereof, said skid section being displaced rearwardly from the forward edge of said bottom and resting thereon, said bottom extending forwardly from said skid section within said open mouth for withdrawal of individual parts therefrom, said feed control plate having a tongue element projecting outwardly from the rearward edge thereof, said rearward wall having a slot embracing said tongue, the side walls each having attachment means engaging the forward portion of the feed control plate, whereby the feed control plate is locked in said bottom by engagement of said tongue with the rear wall and by engagement of said attachment means with the forward portion thereof, said hook elements being engageable over the upper edge of a mating feed box and sustaining the feed box in cantilever fashion from said rear wall at an elevation above the bottom of the mating feed box, whereby a plurality of feed boxes may be stacked one upon another with the open mouth of each box presented to the user for withdrawal of individual parts therefrom.

6. A feeder for dispensing parts individually from a batch comprising, a feed box having a bottom and a pair of side walls formed from a single blank of sheet metal, a rear wall secured to the rearward end of said feed box, said rear wall formed from a separate blank which includes a pair of mounting elements projecting outwardly from the side edges thereof, said side walls each including a slot, the mounting elements of said rear wall passing through said slots from the internal surface of said side walls and being bent rearwardly substantially in parallelism with said side walls, said mounting elements engaging the external surfaces of said side walls and clinching the side walls to the opposite edges of said rear wall, the upper edges of said side walls being inclined downwardly from the rearward portion of the feed box and delineating an open withdrawal mouth, a feed control surface in the bottom of said feed box, said feed control surface having a load bearing section which is inclined upwardly and forwardly from the said rear wall, said feed control surface having a skid section which is inclined downwardly and forwardly from the forward end thereof, the feed box having a generally flat horizontal bottom section extending forwardly from said skid section within said open mouth, whereby a batch of parts is stored upon said load bearing section and advanced down the skid section to the flat bottom section for individual withdrawal from the open mouth of the feed box, said mounting elements being engageable upon the rear wall of a mating feed box and sustaining the feed box in cantilever fashion from said rear wall, whereby a plurality of feed boxes may be stacked one upon another, said mounting elements spacing the bottom of each feed box of the stack above the open withdrawal mouth of the feed box below it for withdrawal of parts from the open mouth of each feed box of the stack.

7. A feeder assembly for dispensing an assortment of parts comprising, a plurality of feed boxes stacked one above the other, each of said feed boxes having a bottom, a pair of side walls and a rear wall, the upper edges of said side walls being inclined downwardly from the rearward toward the forward end of the feed box and delineating an open mouth, said bottom having a load-supporting section which extends from said rear wall toward the forward end of the feed box, said load-supporting section terminating inwardly from the forward end of the feed box and confining a batch of parts in the rearward portion of the feed box, said bottom having a generally horizontal flat withdrawal section extending forwardly from said load-supporting surface within said open mouth, a downwardly inclined skid section extending from the forward edge of said load-supporting section to said flat withdrawal section, a retainer surface sloping upwardly and forwardly from said flat withdrawal section to the outer end of the feed box, the rear wall of each of said feed boxes having a hook element projecting rearwardly therefrom, each hook element having a downwardly facing slot engaged over the upper edge of the rear wall of the feed box residing below it in said stack, each feed box extending in cantilever from said rear wall above the bottom of the feed box below it and presenting the open mouth of the feed box forwardly, whereby a worker may advance a controlled quantity of parts from a batch supported upon the said load-supporting section and down the skid section to the flat withdrawal section at said open mouth of each feed box for individual withdrawal of the parts therefrom.

8. A feeder assembly for dispensing an assortment of parts individually comprising, a plurality of feed boxes stacked one above the other, each of said feed boxes having a bottom, a pair of side walls and a rear wall, the upper edges of said side walls being inclined downwardly from the rearward toward the forward end of the feed box and delineating an open mouth, said bottom having a load-supporting surface which extends from said rear wall toward the forward end of the feed box, said load-supporting surface terminating inwardly from the forward end of the feed box and confining a batch of parts in the rearward portion of the feed box, said bottom having a generally horizontal flat withdrawal surface extending forwardly from said load-supporting surface within said open mouth, a downwardly inclined skid surface extending from the forward edge of said load-supporting surface to said flat withdrawal surface, said side walls converging inwardly toward one another from the upper edges thereof toward the bottom of the feed box, the rear wall of each of said feed boxes having a mounting element projecting rearwardly therefrom and engaged over the upper edge of the rear wall of the feed box residing below it in said stack, each feed box extending in cantilever from said rear wall, the bottom portion of each box being partially nested between the converging side walls of the box below it in the stack, the open mouth of each box being presented forwardly, whereby a worker may advance a controlled quantity of parts from the batch supported upon the said load-supporting surface and down the skid surface to the flat withdrawal surface at said open mouth of each feed box for individual withdrawal of the parts therefrom.

9. A feeder for dispensing parts individually from a batch of parts confined therein comprising, a feed box having a bottom, a pair of side walls, and a rear wall, said side walls delineating an open mouth, said bottom having a load-supporting surface residing in the rearward portion of the feed box, said load-supporting surface terminating inwardly from the forward end of the feed box, said bottom having a generally horizontal flat withdrawal surface extending forwardly from said load-supporting surface, a downwardly inclined skid surface extending from the forward edge of said load-supporting surface to said flat withdrawal surface, an extension hopper, said extension hopper having a pair of spaced side walls, a rear wall, a front wall, and an open discharge passage at the lower end thereof, mounting means supporting the extension hopper above the bottom of the feed box with the discharge passage thereof residing above the load-supporting surface of the feed box, the front wall of the extension hopper having a lower edge which is spaced above the forward portion of the load-supporting surface which adjoins the downwardly inclined skid surface, said extension hopper adapted to contain a batch of parts and to advance the parts by gravity from the discharge passage downwardly along said skid surface to the flat withdrawal surface of the feed box for individual withdrawal from said open mouth.

10. A feeder for dispensing parts individually from a batch of parts confined therein comprising, a feed box having a bottom, a pair of side walls, and a rear wall, the upper edges of said side walls being inclined downwardly from the rearward toward the forward end of the feed box and delineating an open mouth, said bottom having a load-supporting surface which extends from said rear wall toward the forward end of the feed box, said load-supporting surface terminating inwardly from the forward end of the feed box, said bottom having a generally horizontal flat withdrawal surface extending forwardly from said load-supporting surface within said open mouth, a downwardly inclined skid surface extending from the forward edge of said load-supporting surface to said flat withdrawal surface, a retainer surface sloping upwardly and forwardly from said flat bottom surface at the outer end of said feed box, said side walls converging inwardly from the upper edges thereof toward said bottom, an extension hopper, said extension hopper having a pair of spaced side walls, a rear wall, a front wall, and an open discharge passage at the lower end thereof, a clip element mounted on the rear wall of the hopper and engaged over the rear wall of the feed box, said hopper being partially nested between the converging side walls of the feed box, the front wall of the hopper residing above said skid surface, and a pair of support elements projecting inwardly from the internal surface of the side walls of the feed box, the lower edge of the extension hopper resting upon said elements and being supported by said elements in a position above the forward portion of the load-supporting surface which adjoins the downwardly inclined skid surface, said extension hopper adapted to contain a batch of parts and to advance the parts by gravity from said discharge passage downwardly along said skid surface to the flat withdrawal surface of the feed box for individual withdrawal from said open mouth.

11. A feeder for dispensing parts individually from a batch of parts confined therein comprising, a feed box having a bottom, a pair of side walls, and a rear wall, said side walls delineating an open mouth, said bottom having a load-supporting surface which extends from said rear wall toward the forward end of the feed box, said load-supporting surface terminating inwardly from the forward end of the feed box, said bottom having a generally horizontal flat withdrawal surface extending forwardly from said load-supporting surface, a downwardly inclined skid surface extending from the forward edge of said load-supporting surface to said flat withdrawal surface, said side walls converging inwardly from the upper edges thereof, toward said bottom, an extension hopper, a mounting element on the rearward portion of said extension hopper connected to the rear wall of the feed box, said hopper having an open discharge passageway at the lower end thereof which is nested between the converging side wall of the feed box, said discharge passageway residing above the load-supporting surface of the feed box, and support means on the feed box supporting the forward portion of the extension hopper, said discharge passageway having a lower edge at the forward portion thereof which is spaced above the forward portion of the load-supporting surface which adjoins the downwardly inclined skid surface, said extension hopper adapted to contain a batch of parts and to advance the parts by gravity from said discharge passageway downwardly along said skid section to the flat bottom of the feed box for individual withdrawal from said open mouth.

References Cited in the file of this patent

UNITED STATES PATENTS

| | | |
|---|---|---|
| 509,861 | Bigelow | Dec. 5, 1893 |
| 2,652,012 | Ischinger | Sept. 15, 1953 |
| 2,652,174 | Shea et al. | Sept. 15, 1953 |
| 2,762,529 | Johnson | Sept. 11, 1956 |